(12) United States Patent
Wang et al.

(10) Patent No.: US 11,622,343 B2
(45) Date of Patent: Apr. 4, 2023

(54) USER EQUIPMENT AND COMMUNICATION METHODS CONSIDERING INTERFERENCE

(71) Applicant: Panasonic Intellectual Property Corporation of America, Torrance, CA (US)

(72) Inventors: Lilei Wang, Beijing (CN); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 65 days.

(21) Appl. No.: 17/256,261

(22) PCT Filed: Aug. 8, 2018

(86) PCT No.: PCT/CN2018/099443
§ 371 (c)(1),
(2) Date: Dec. 28, 2020

(87) PCT Pub. No.: WO2020/029127
PCT Pub. Date: Feb. 13, 2020

(65) Prior Publication Data
US 2021/0127365 A1 Apr. 29, 2021

(51) Int. Cl.
*H04W 72/02* (2009.01)
*H04W 72/04* (2009.01)
*H04W 72/08* (2009.01)
*H04W 72/044* (2023.01)

(52) U.S. Cl.
CPC ......... *H04W 72/02* (2013.01); *H04W 72/044* (2013.01); *H04W 72/085* (2013.01)

(58) Field of Classification Search
CPC .................................................. H04W 72/02
See application file for complete search history.

(56) References Cited

U.S. PATENT DOCUMENTS

| 11,432,264 | B2* | 8/2022 | Min | H04W 24/10 |
|---|---|---|---|---|
| 2017/0272299 | A1* | 9/2017 | Chae | H04W 76/14 |
| 2017/0325260 | A1* | 11/2017 | Guo | H04W 74/006 |
| 2019/0014564 | A1* | 1/2019 | Lee | H04W 72/1257 |

(Continued)

OTHER PUBLICATIONS

International Search Report, dated Mar. 27, 2019, for corresponding International Application No. PCT/CN2018/099443, 2 pages.

*Primary Examiner* — Edan Orgad
*Assistant Examiner* — Won Tae C Kim
(74) *Attorney, Agent, or Firm* — Seed IP Law Group LLP

(57) ABSTRACT

Provided are user equipment (UE) and communication methods. The UE includes: a receiver, operative to receive transmissions of a TB performed by another UE using each of a first set of beams respectively; circuitry, operative to perform measurement on the received transmissions, and to select resource for sidelink transmission among candidate resources based on a measurement result; and a transmitter, operative to perform the sidelink transmission with the selected resource, wherein the circuitry is further operative to preclude, from the candidate resources, one or more candidate resources associated with a transmission using a beam of the first set of beams, if the measurement result of the transmission using the beam fulfills a predetermined condition.

12 Claims, 10 Drawing Sheets

(56) References Cited

U.S. PATENT DOCUMENTS

| | | | |
|---|---|---|---|
| 2019/0166640 A1* | 5/2019 | Wei | H04W 76/14 |
| 2019/0253927 A1* | 8/2019 | Mok | H04W 28/0268 |
| 2020/0221423 A1* | 7/2020 | Wang | H04W 72/0453 |
| 2020/0359357 A1 | 11/2020 | Yasukawa et al. | |
| 2021/0195543 A1* | 6/2021 | Lee | H04W 8/24 |

* cited by examiner

USER EQUIPMENT AND COMMUNICATION METHODS CONSIDERING INTERFERENCE

BACKGROUND

1. Technical Field

The present disclosure relates to wireless communication field, and in particular, to a user equipment (UE) and communication methods related to sensing and resource selection when beam sweeping is used for New Radio (NR) sidelink.

2. Description of the Related Art

Beam sweeping has become one of critical issues discussed in 3rd Generation Partnership Project (3GPP) so far. It is supported in NR in a case of mm Wave assuming analogue beamforming or hybrid beamforming is used in a gNB to guarantee the coverage, which means the gNB sweeps a plurality of differently directed beams to fully cover a cell it serves.

For NR sidelink-based Vehicle to Everything (V2X), beam sweeping will be applied in a case that analogue beamforming or hybrid beamforming is used in vehicles as well. So far, it is still under discussion about the design of sensing and resource selection behavior to support beam sweeping in NR sidelink-based V2X.

SUMMARY

One non-limiting and exemplary embodiment facilitates sensing and resource selection for transmission using beam sweeping in NR sidelink-based V2X.

In a general aspect of the present disclosure, there is provided a user equipment, comprising: a receiver, operative to receive transmissions of a Transport Block (TB) performed by another UE using each of a first set of beams respectively; circuitry, operative to perform measurement on the received transmissions, and to select resource for sidelink transmission among candidate resources based on a measurement result; and a transmitter, operative to perform the sidelink transmission with the selected resource, wherein, the circuitry is further operative to preclude, from the candidate resources, one or more candidate resources associated with a transmission using a beam of the first set of beams, if the measurement result of the transmission using the beam fulfills a predetermined condition.

In another general aspect of the present disclosure, there is provided a communication method, comprising: receiving, at a UE, transmissions of a TB performed by another UE using each of a first set of beams respectively; performing measurement on the received transmissions, and selecting resource for sidelink transmission among candidate resources based on a measurement result; and performing the sidelink transmission with the selected resource, wherein, the method further comprises precluding, from the candidate resources, one or more candidate resources associated with a transmission using a beam of the first set of beams, if the measurement result of the transmission using the beam fulfills a predetermined condition.

In another general aspect of the present disclosure, there is provided a user equipment, comprising: a receiver, operative to perform sidelink reception from a second UE, wherein, the sidelink reception is performed with resource which is selected by the second UE among candidate resources based on a measurement result, the measurement result being obtained by the second UE performing measurement on transmissions of a TB received from a third UE and performed by the third UE using each of a first set of beams respectively, and wherein, one or more candidate resources associated with a transmission by the third UE using a beam of the first set of beams are precluded from the candidate resources, if the measurement result of the transmission by the third UE using the beam fulfills a predetermined condition.

In another general aspect of the present disclosure, there is provided a communication method, comprising: performing, at a UE, sidelink reception from a second UE, wherein, the sidelink reception is performed with resource which is selected by the second UE among candidate resources based on a measurement result, the measurement result being obtained by the second UE performing measurement on transmissions of a TB received from a third UE and performed by the third UE using each of a first set of beams respectively, and wherein, one or more candidate resources associated with a transmission by the third UE using a beam of the first set of beams are precluded from the candidate resources, if the measurement result of the transmission by the third UE using the beam fulfills a predetermined condition.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
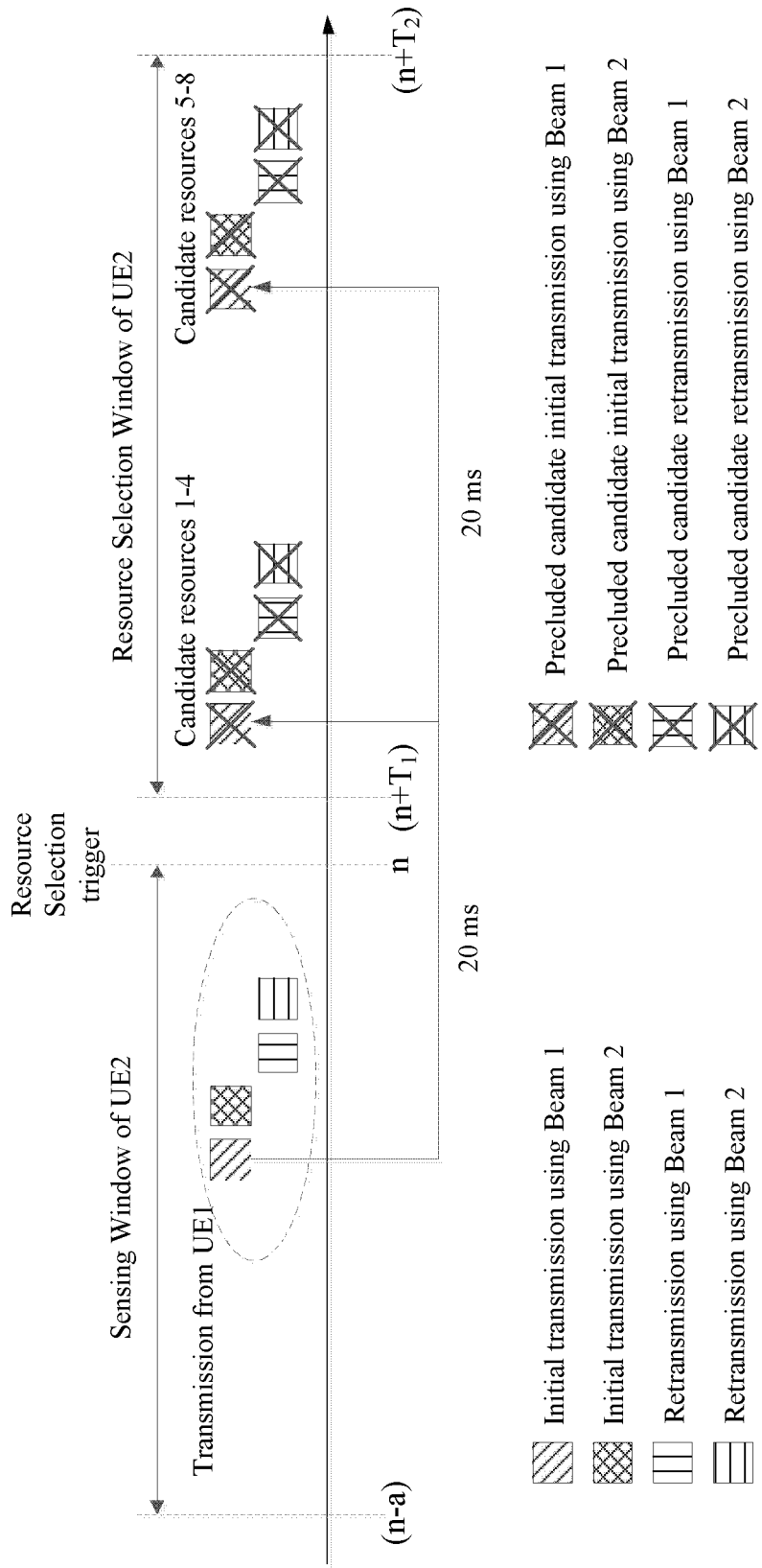
FIG. 1 schematically shows an exemplary scenario of candidate resource precluding when beam sweeping is applied.

In the following detailed description, reference is made to the accompanying drawings, which form a part thereof. In the drawings, similar symbols typically identify similar components, unless context dictates otherwise. It will be understood that the aspects of the present disclosure can be arranged, substituted, combined, and designed in a wide variety of different configurations, all of which are explicitly contemplated and make part of this disclosure.

In LTE V2X, retransmission is supported for a certain TB transmission to solve half duplex issue which means that a UE could not transmit and receive at the same time in a carrier due to RF constraint. In case a certain UE (e.g., UE2) misses one TB (e.g., initial transmission) from another UE (e.g., UE1) due to various reasons such as a transmission by the UE2 itself, UE2 may still be able to receive the TB from UE1 (e.g., via retransmission). In addition, a resource for initial transmission of a TB and a resource for retransmission of the same TB are separately selected from a candidate resource set within a resource selection window.

For NR sidelink-based Vehicle to Everything (V2X), beam sweeping will be applied in a case that analogue beamforming or hybrid beamforming is used in vehicles as well. In order to support beam sweeping, a UE may perform initial transmissions of a TB using each of a set of beams respectively, and perform retransmissions of the same TB using each of the set of beams respectively, wherein the set of beams includes one or more differently directed beams.

So far, it is still under discussion about the design of sensing and resource selection behavior to support beam sweeping in NR sidelink-based V2X. During sensing and resource selection procedure, a UE may sense a plurality of resources during a sensing window; preclude, from a candidate resource set included within a resource selection window, one or more candidate resources that are unsuitable or improper for transmitting a current traffic based on a sensing result; rank candidate resources remaining in the candidate resource set suffered preclusion; and select, from the candidate resources remaining in the candidate resource set, one or more resources for transmitting the current traffic based on a ranking result.

It should be noted that, the embodiments herein disclosed are applicable to V2X (Vehicle to Everything) that includes but not limited to V2I (vehicle to infrastructure), V2P (vehicle to pedestrian), V2V (vehicle to vehicle), and any other communication using NR sidelink.

FIG. 1 schematically shows an exemplary scenario of candidate resource precluding when beam sweeping is applied. When a certain UE (i.e., UE2) senses transmissions of a certain TB performed by another UE (i.e., UE1) using a set of beams, for example, at least one of initial transmissions of the TB and retransmissions of the same TB using the set of beams, the UE2 may assume all sensed transmissions related to the same TB have same power, for example, both of the initial transmissions and the retransmissions are assumed to have same power. Further, the UE2 may assume that the UE1 will periodically perform transmissions. Therefore, to avoid possible large interference during transmission by the UE2, the UE2 may preclude candidate resources which are associated with all transmissions using the set of beams to be performed by the UE1 for next several transmission periods falling within the resource selection window of the UE2, if any one of the sensed transmissions is sensed to have large interference. The interference may be determined by performing measurement on the sensed transmissions. For example, the UE1 is determined to be an interfering UE to the UE2 if a measurement result of Reference Signal Received Power (RSRP) of sidelink SS or PSBCH measured by UE2 on any one of the sensed transmissions exceeds a certain threshold.

As shown in FIG. 1, UE1 is sensed by UE2 as an interfering UE during sensing procedure of the UE2. It is assumed that the UE1 transmits its traffic periodically. In an embodiment, the UE1 has a set of beams including, for example, two beams, i.e., Beam 1 and Beam 2. In one example, the UE1 performs initial transmissions using Beam 1 and Beam 2 without any retransmission. In another example, for each of Beam 1 and Beam 2, the UE1 performs both initial transmission and retransmission for a certain TB. In the latter case, the UE1 totally transmits the same TB for four times in different time. For a current traffic of the UE2, a sensing window for the UE2 is configured, preconfigured or specified as a time interval from a timing (n−a) to a timing n, i.e., the time interval [n−a, n], and a resource selection window for the UE2 is configured, preconfigured or specified as a time interval $[n+T_1, n+T_2]$, both of which are specified in the specification 3GPP TS 36.213_v15.1.0, wherein the timing n is a timing of resource selection trigger for the current traffic indicated by a higher layer signaling.

In the case of the UE1 performing both the initial transmissions and retransmissions for the TB, when any one of initial transmission using Beam 1, initial transmission using Beam 2, retransmission using Beam 1 and retransmission using Beam 2, for example, initial transmission using Beam 1 as shown in FIG. 1, is sensed by the UE2 as large interference, the UE2 may predict certain candidate resources, at resource positions in time domain which are overlapped with those where the UE1 are assumed to perform the initial transmissions and the retransmissions periodically during the resource selection window of the UE2, would be potentially subject to large interference from the UE1, since the UE1 is assumed to perform the initial transmission and the retransmission periodically, and the initial transmission and the retransmission associated with the same TB have same power. Accordingly, the UE2 may preclude the certain candidate resources associated with initial transmissions using Beams 1 and 2 and retransmissions using Beams 1 and 2. That is, all of candidate resources 1-8 as shown in FIG. 1 will be precluded according to this embodiment, for example.

However, differently directed beams in the set of beams of the UE1 may have different interference to the UE2. For example, initial transmission or retransmission using Beam 1 may generate interference to transmission behavior of the UE2. On the other hand, initial transmission or retransmission using Beam 2 may not cause interference or may cause interference that is small enough to be ignored for current transmission of the UE2. In this case, precluding all of candidate resources 1-8 would result in a waste of resources in the resource selection window.

Figure 2:
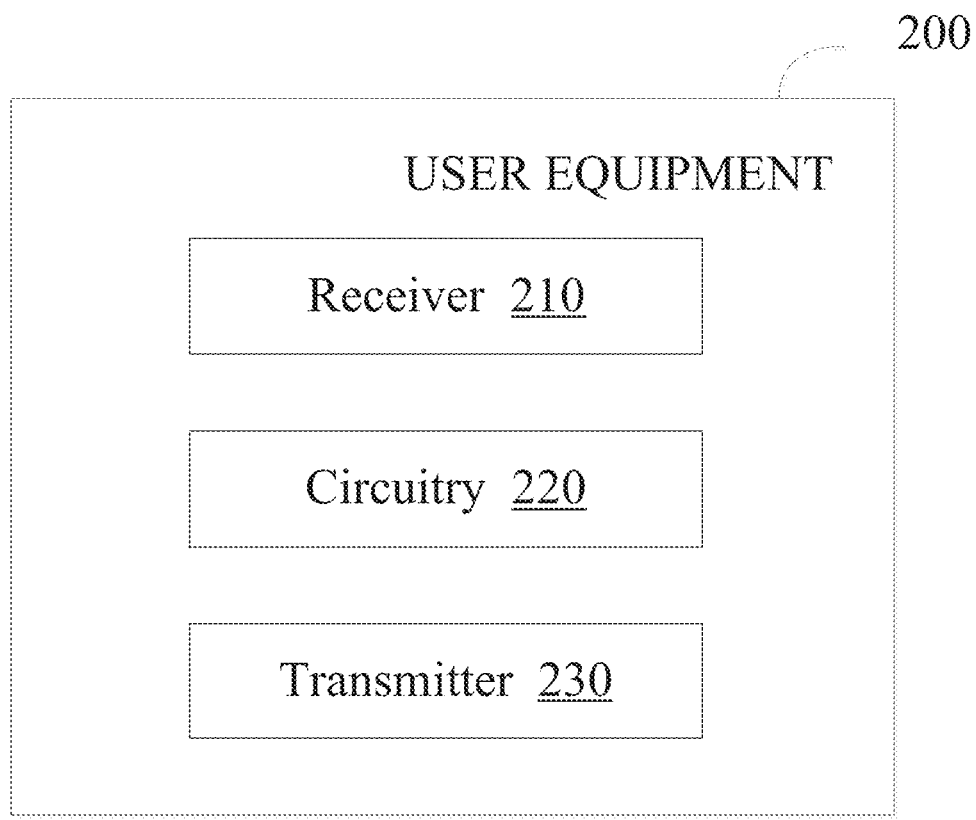
FIG. 2 illustrates a block diagram of a user equipment according to an embodiment of the present disclosure.

In view of the above, in order to facilitate sensing and resource selection for transmission using beam sweeping in NR sidelink-based V2X, in an embodiment of the present disclosure, there is provided a user equipment as shown in FIG. 2. FIG. 2 illustrates a block diagram of a part of a user equipment 200 according to an embodiment of the present disclosure.

As shown in FIG. 2, the UE 200 may include a receiver 210, circuitry 220 and a transmitter 230. In an embodiment, the receiver 210 is operative to receive transmissions of a TB performed by another UE (i.e., UE1) using each of a first set of beams respectively. The circuitry 220 is operative to perform measurement on the received transmissions, and to select resource for sidelink transmission among candidate resources based on a measurement result. In an embodiment, the circuitry 220 is further operative to preclude, from the candidate resources, one or more candidate resources associated with a transmission using a beam of the first set of beams, if the measurement result of the transmission using the beam fulfills a predetermined condition. The transmitter 230 in the UE 200 is operative to transmit the traffic by using the selected resources.

In an embodiment, receiving transmissions of a TB performed by another UE using each of a first set of beams respectively comprises: receiving at least one of initial transmissions of the TB and retransmissions of the same TB using each of the first set of beams respectively. Further, precluding one or more candidate resources associated with a transmission using a beam of the first set of beams comprises: precluding one or more candidate resources associated with at least one of initial transmission and retransmission using the beam of the first set of beams.

In an embodiment, the beam of the first set of beams with which the one or more candidate resources to be precluded are associated (hereinafter referred to as "associated beam") is determined by measuring RSRP of sidelink SS or PSBCH for the received transmissions performed by the UE1 using the first set of beams.

As described above, differently directed beams in the first set of beams of the UE1 may have different interference to the UE 200, thus the UE 200 may not need to consider interference from all beams in the first set of beams of the UE1. In other words, in order to avoid wasting candidate resources within a resource selection window, the UE 200 precludes one or more candidate resources related to the associated beam instead of related to all beams in the first set of beams of the UE1. More details of the associated beam will be discussed later with reference to FIG. 3.

In an embodiment, if the UE2 receives transmissions of a certain TB performed by the UE1 using each of a first set of beams respectively during sensing procedure of the UE2, the UE2 may assume that the UE1 will perform transmissions periodically. In order to avoid possible large interference during transmission by the UE2 itself, the UE2 may preclude candidate resources associated with transmissions using the associated beam in the first set of beams to be performed by the UE1 for next several transmission periods falling within the resource selection window of the UE2, if the received transmission using the associated beam is sensed to have large interference.

In an example, transmissions of a certain TB performed by the UE1 comprise only initial transmissions using each of the first set of beams respectively. In this case, the UE2 may receive only those initial transmissions, and further preclude candidate resources associated with initial transmissions using the associated beam to be performed during the resource selection window of the UE2, if a measurement result of the received transmission using the associated beam fulfills a predetermined condition.

In another example, transmissions of a certain TB performed by the UE1 comprise both initial transmissions using each of the first set of beams respectively and retransmissions using each of the first set of beams respectively. In this case, the UE2 may receive at least one of the initial transmissions and the retransmissions, and further preclude candidate resources associated with initial transmissions and retransmissions using the associated beam to be performed during the resource selection window of the UE2, if a measurement result of the received at least one of the initial transmission and the retransmission using the associated beam fulfills a predetermined condition.

Figure 3:
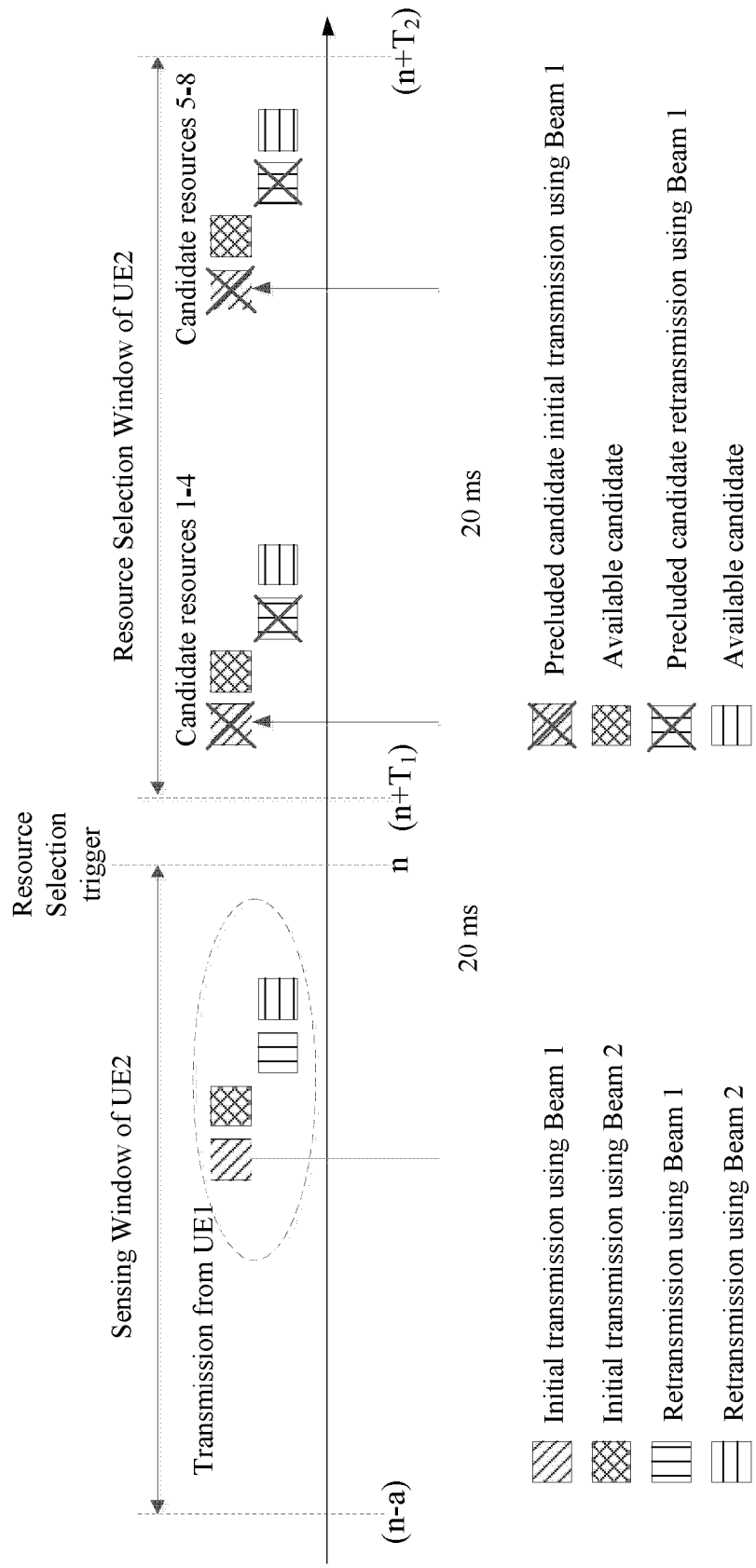
FIG. 3 schematically shows an exemplary scenario of candidate resource precluding when beam sweeping is applied in NR sidelink according to an embodiment of the present disclosure.

FIG. 3 schematically shows an exemplary scenario of candidate resource precluding when beam sweeping is applied in NR sidelink according to an embodiment of the present disclosure. It is assumed that beam sweeping is used by a UE1 shown in FIG. 3 for each channel transmission when analogue beamforming or hybrid beamforming is applied to the UE1. In addition, a UE 2 shown in FIG. 3 may be implemented, for example, as the UE 200 shown in FIG. 2.

As shown in the example of FIG. 3, the UE1 is sensed by the UE2 as an interfering UE during sensing procedure of the UE2. In an embodiment, the UE1 has a set of beams including, for example, two beams, i.e., Beam 1 and Beam 2. In one example, the UE1 performs initial transmissions using Beam 1 and Beam 2 respectively without any retransmission. In another example, for each of Beam 1 and Beam 2, the UE1 performs both initial transmission and retransmission. In the latter case, the UE1 totally transmits the same TB for four times in different time, i.e., initial transmission using Beam 1, initial transmission using Beam 2, retransmission using Beam 1 and retransmission using Beam 2. The following description is made by taking the UE1 performing both initial transmissions and retransmissions as an example only for illustrative purpose, but not limited thereto.

It should be noted that two beams of the UE1 as shown in the example of FIG. 3 are only illustrative, but not limited thereto. For example, the number of beams in the first set of beams of the UE1 is not limited to two, and may be any suitable number depending on design requirement, according to the embodiments of the present disclosure. For example, in an embodiment, the first set of beams of the UE1 may include only one beam, three or more beams.

It should also be noted that the initial transmissions using each of the first set of beams respectively and the retransmissions using each of the first set of beams respectively as shown in example of FIG. 3 are only illustrative, but not limited thereto. In other words, beams used for initial transmissions of the TB may be different from beams used for the retransmissions of the same TB. In an embodiment, the first set of beams of the UE1 may be divided into two subsets of which one is used for initial transmissions and the other one is used for retransmissions. For example, it is assumed that the UE1 has a first set of beams including five beams, of which three are considered as a first subset of beams used for initial transmissions, and the other two are considered as a second subset of beams used for retransmissions. Optionally, each beam in the second subset of beams used for retransmissions may be a little wider than that in the first subset of beams used for initial transmissions.

For a current traffic of the UE2, in order to sense and select resource for transmitting the current traffic, a sensing window for the UE2 is configured, preconfigured or specified, for example, as a time interval from a timing (n−a) to a timing n, i.e., the time interval [n−a, n], and a resource selection window for the UE2 is configured, preconfigured or specified, for example, as a time interval [n+$T_1$, n+$T_2$], wherein the timing n is a timing of resource selection trigger for the current traffic indicated by a higher layer signaling.

In an embodiment, the receiver 210 of the UE 2 receives at least one of initial transmissions using Beams 1 and 2 and retransmissions using Beams 1 and 2. In an example, the receiver 210 of the UE 2 may receive both of initial transmissions using Beams 1 and 2 and retransmissions using Beams 1 and 2. In another example, the receiver 210 of the UE 2 may receive only initial transmissions using Beams 1 and 2 and misses retransmissions using Beams 1 and 2. In still another example, the receiver 210 of the UE 2 may receive only retransmissions using Beams 1 and 2 and misses initial transmissions using Beams 1 and 2. In either of the latter two cases, as long as the UE2 detects positions in time domain for any one of the initial transmissions and the corresponding retransmissions of the UE1, the UE2 can derive positions in time domain for the other one of the initial transmissions and the corresponding retransmissions of the UE1, based on an indication in Physical Sidelink Control Channel (PSCCH) of the UE1. That is, a transmission interval between the initial transmission and the corresponding retransmission using the same beam is indicated in PSCCH of the UE1, for example, in Sidelink Control Information (SCI) transmitted on PSCCH of the UE1.

After receiving at least one of initial transmissions using Beams 1 and 2 and retransmissions using Beams 1 and 2 from the UE1, the circuitry 220 of the UE 2 performs measurement on the received at least one of initial transmissions using Beams 1 and 2 of the UE1 and retransmissions using Beams 1 and 2 of the UE1, and then selects resource for sidelink transmission among candidate resources within the resource selection window based on a measurement result. In one embodiment, the circuitry 220 of the UE2 performs RSRP measurement to obtain the measurement result.

In the resource selection window shown in FIG. 3, only candidate resources 1 to 8 are shown for illustrative purposes. However, the number of candidate resources in the resource selection window of the UE2 is not limited to 8, and there can be any number of candidate resources depending on practical applications and scenarios according to the embodiments of the present disclosure.

In an embodiment, the circuitry 220 of the UE2 may preclude, among candidate resources 1 to 8, one or more candidate resources associated with initial transmission and corresponding retransmission using an associated beam in the first set of beams of the UE1. The associated beam refers to a beam using which periodic initial transmission or periodic retransmission of the UE1 may cause large interference to the UE2 when resource positions of candidate resources in time domain overlap with resource positions where the periodic initial transmission and the periodic retransmission are predicted to be performed during the resource selection window of the UE2.

Furthermore, in an embodiment, the associated beam is determined by the circuitry 220 of the UE2 measuring RSRP of sidelink SS or PSBCH for the at least one of initial transmissions using Beams 1 and 2 and retransmissions using Beams 1 and 2 received from the UE1, assuming the UE1 sweeps Beam 1 and Beam 2 for sidelink SS or PSBCH transmission. In one example, initial transmission and corresponding retransmission of a same TB are assumed to have same power. In this case, if the UE2 receives both the initial transmission and the retransmission, the UE2 may obtain a measurement result for the other one of the initial transmission and the retransmission with performing measurement on only one of the initial transmission and the retransmission. In another example, the initial transmission and the retransmission are assumed to have different powers, and the power difference between the initial transmission and the retransmission is indicated by control signaling (e.g., PSCCH or higher layer signaling) or specified in the specification. In this case, if the UE2 receives both the initial transmission and the retransmission, the UE2 may obtain a measurement result for the other one of the initial transmission and the retransmission based on the power difference with performing measurement on only one of the initial transmission and the retransmission. In still another example, the initial transmission and the retransmission are assumed to have different powers which are independent from each other. In this case, if the UE2 receives both the initial transmission and the retransmission, the UE2 needs to perform measurement on both the initial transmission and the retransmission respectively, in order to determine the associated beam. The following description is made by taking the initial transmissions and the corresponding retransmissions having the same power as an example only for illustrative purpose, but not limited thereto.

As shown in FIG. 3, after sidelink SSs or PSBCHs for the initial transmission using Beam 1 and the initial transmission using Beam 2 transmitted from the UE1 are measured respectively by the circuitry 220 of the UE2 during the sensing window, for example, the initial transmission using Beam 1 is determined to fulfill a predetermined condition which indicates large interference to the UE2. In this case, the UE2 predicts the initial transmission using Beam 1 and the retransmission using Beam 1 to be performed by the UE1 periodically during the resource selection window of the UE2 may cause large interference to current transmission of the UE2. On the other hand, the UE2 predicts the initial transmission using Beam 2 and the retransmission using Beam 2 to be performed by the UE1 periodically during the resource selection window of the UE2 may not cause interference or may cause interference that is small enough to be ignored for current transmission of the UE2. In this sense, Beam 1 in the first set of the UE1 is determined by the UE2 as the associated beam to be used for precluding candidate resources within the resource selection window of the UE2.

In an embodiment, the predetermined condition, which indicates large interference to current transmission of the UE2, is that the measured RSRP exceeds a certain threshold. In the example of FIG. 3, the measured RSRP of sidelink SS or PSBCH for the initial transmission using Beam 1 exceeds the certain threshold. In an embodiment, the certain threshold may vary depending on practical applications and scenarios. For example, a corresponding threshold may be configured or preconfigured for a certain value of ProSe Per-Packet Priority (PPPP) of the traffic to be transmitted currently by the UE2. Further, it is to be noted that the predetermined condition is not limited to the measured RSRP exceeding a certain threshold, as long as it can indicate large interference to current transmission of the UE2.

After the associated beam, for example Beam 1 in the example of FIG. 3, in the first set of beams of the UE1 is determined, the circuitry 220 of the UE2 precludes one or more candidate resources associated with initial transmission and corresponding retransmission using the associated beam. For example, assuming UE1 perform the initial transmission and the retransmission periodically, the UE2 may predict resource positions in time domain where the UE1 will perform the initial transmission(s) and the retransmission(s) using the associated beam for next K transmission periods within the resource selection window of the UE2, according to resource position of received at least one of the initial transmission or the retransmission using the associated beam, wherein K is an integer greater than zero. In one embodiment, the transmission period (for example, 20 ms) of the UE1 is indicated in PSCCH of the UE1, for example, in SCI transmitted on PSCCH of the UE1. Furthermore, after the prediction described above, the UE2 determines that certain candidate resources at those predicted resource positions in time domain (if any) would be potentially subject to large interference from the UE1, since at least one of the initial transmission or the retransmission using the associated beam received from the UE1 during the sensing window of the UE2 has been sensed to having large interference to the UE2. As a result, the certain candidate resources of the UE2, at those predicted resource positions in time domain where it is predicted that the UE1 would perform the initial transmission and the retransmission using the associated beam, are determined to be associated with the initial transmission and the retransmission using the associated beam and are to be precluded by the UE2.

For example, as shown in FIG. 3, two (i.e., K=2) transmission periods of the UE1 are included within the resource selection window of the UE2. That is, the predicted resource positions in time domain where the UE1 is predicted to perform the initial transmission using Beam 1, the initial transmission using Beam 2, the retransmission using Beam 1 and the retransmission using Beam 2 for the next one period overlap with resource positions of candidate resources 1, 2, 3, and 4 in time domain respectively, and the predicted resource positions in time domain where the UE1 is predicted to perform the initial transmission using Beam 1, the initial transmission using Beam 2, the retransmission using Beam 1 and the retransmission using Beam 2 for the next two period overlap with resource positions of candidate resources 5, 6, 7, and 8 in time domain respectively.

As discussed above, Beam 1 of the UE1 is determined as the associated beam, thus the candidate resources 1, 3, 5, and 7 are precluded. For example, the candidate resources 1 and 5 are precluded since the UE2 predicts that the UE1 will perform the initial transmissions using Beam 1 for the next two periods respectively at the same positions in time domain as those of the candidate resources 1 and 5. That is, resource positions in time domain of the candidate resources 1 and 5 are overlapped with the predicted resource positions in time domain of the initial transmissions using Beam 1 for the next two periods respectively. Similarly, the candidate resources 3 and 7 are precluded since the UE2 predicts that the UE1 will perform the retransmissions using Beam 1 for the next two periods respectively at the same positions in time domain as those of the candidate resources 3 and 7. That is, resource positions in time domain of the candidate resources 3 and 7 are overlapped with the predicted resource positions in time domain of the retransmissions using Beam 1 for the next two periods respectively.

In addition, candidate resources 2, 4, 6, and 8 are not precluded, since Beam 2 of the UE1 is not determined as an associated beam. However, whether the UE2 will select candidate resources 2, 4, 6, and 8 as final resource for current transmission depends on a ranking result for a subset of candidate resources after some candidate resources (for example, candidate resources 1, 3, 5, and 7) are precluded from a candidate resource set in the resource selection window according to the embodiment of the present disclosure. In an embodiment, the circuitry 220 of the UE2 is further operative to rank each candidate resource in the subset of candidate resources obtained by precluding some candidate resources from the candidate resources set in the resource selection window, based on measured S-RSSI for respective candidate resource.

It should be noted that, the number of beams (for example, two) in the first set of beams of the UE1, the number of associated beam (for example, one) and the index of the associated beam (for example, first) as shown in FIG. 3 are only for illustrative purposes. There may be any suitable number of beams in the first set of beams depending on practical applications and scenarios, and there may also be any suitable number of associated beam(s) depending on practical applications and scenarios, as long as the number of the associated beam(s) is not larger than the number of beams in the first set of beams of the UE1. Additionally, the candidate resources 1 to 8 are only shown for illustrative purposes, and the skilled in the art will understand that the resource selection window may include a part of the candidate resources 1 to 8 in one embodiment, and may include one or more additional candidate resources other than the candidate resources 1 to 8 in another embodiment.

Advantageously, the currently transmitting UE may not need to consider interference from all beams of the interfering UE when selecting resources for transmitting a current traffic, since differently directed beams of the interfering UE may have different interference to the currently transmitting UE. In other words, by precluding one or more candidate resources related to the associated beam(s) instead of related to all beams of the interfering UE, the resource utilization in the resource selection window can be improved since candidate resources that are unnecessarily precluded are reduced.

Figure 4:
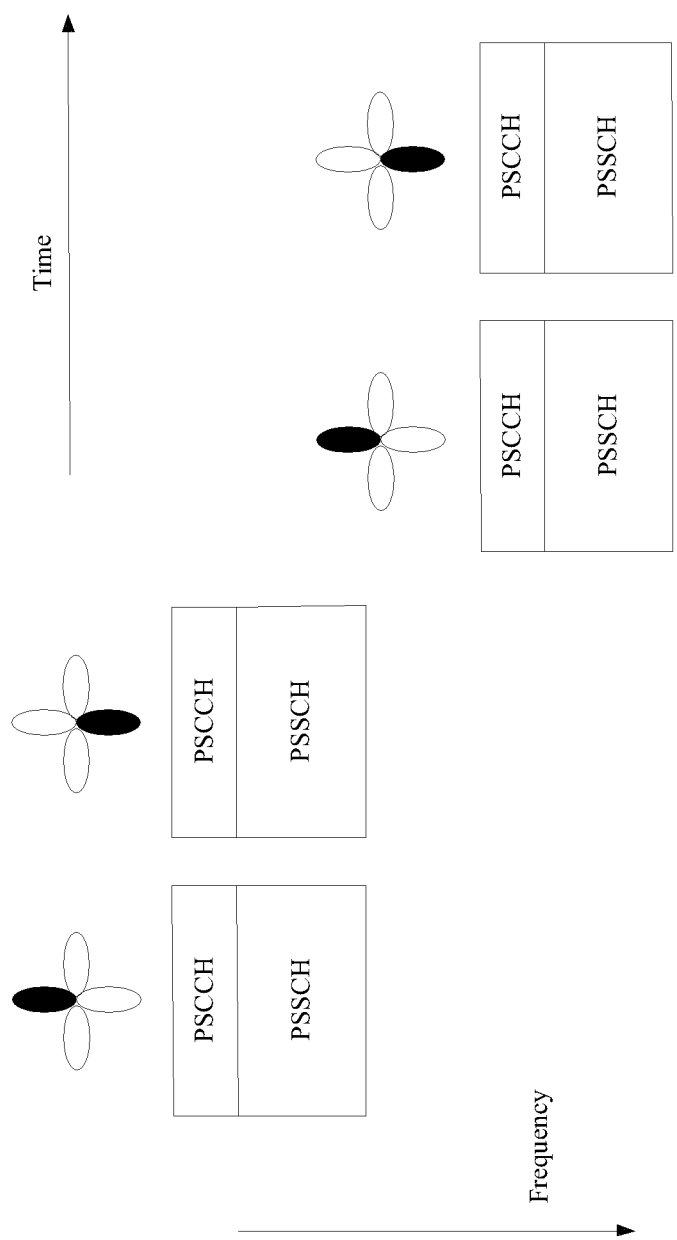
FIG. 4 schematically shows resource positions in frequency domain and time domain of initial transmissions and corresponding retransmissions using a plurality of beams according to an embodiment of the present disclosure.

FIG. 4 schematically shows resource positions in frequency domain and time domain of initial transmissions and corresponding retransmissions using a plurality of beams according to an embodiment of the present disclosure. In an embodiment, initial transmissions or retransmission of a same TB using different beams of a UE are performed on a same position in frequency domain and consecutive positions in time domain.

FIG. 4 schematically shows an example in which a UE has a set of beams including two different beams, for example, a first beam and a second beam. As shown in FIG. 4, initial transmission using the first beam and initial transmission using the second beam are performed on a same position in frequency domain and consecutive positions in time domain. Similarly, retransmission using the first beam and retransmission using the second beam are performed on a same position in frequency domain and consecutive positions in time domain.

It should be noted that two beams of the UE as shown in the example of FIG. 4 are only illustrative but not limited thereto. In other words, there may be any suitable number of beams of the UE according to the embodiments of the present disclosure. For example, it can be assumed that initial transmissions using each of n beams are performed on a same position in frequency domain and consecutive positions in time domain, and retransmissions using each of the n beams are performed on a same position in frequency domain and consecutive positions in time domain, when the UE has the n beams, wherein n is an integer greater than or equal to 2.

It should also be noted that the initial transmissions using each of the set of beams (i.e., the first beam and the second beam) respectively and the retransmissions using each of the set of beams respectively as shown in example of FIG. 4 are only illustrative, but not limited thereto. In other words, beams used for initial transmissions of the TB may be different from beams used for the retransmissions of the same TB. In an embodiment, the set of beams of the UE may be divided into two subsets of which one is used for initial transmissions and the other one is used for retransmissions. For example, it is assumed that the UE has a set of beams including five beams, of which three are considered as a first subset of beams used for initial transmissions, and the other two are considered as a second subset of beams used for retransmissions.

Optionally, each beam in the second subset of beams used for retransmissions may be a little wider than that in the first subset of beams used for initial transmissions.

Furthermore, it should be noted that, the UE shown in FIG. 4 may be implemented as the interfering UE1 using a first set of beams to perform sidelink transmission as discussed above, or may be implemented as the currently transmitting UE2 using a second set of beams to perform sidelink transmission which will be described later with reference to FIG. 5.

In addition, in an embodiment, beam index of each beam in the set of beams of the UE is indicated in PSCCH of the UE, for example, in SCI transmitted on PSCCH of the UE, if the UE uses the set of beams to perform sidelink transmission.

Furthermore, in an embodiment, the number of beams in a set of beams of a UE may be implied by sidelink SS or indicated in PSBCH. For example, the number of beams may be known implicitly via sidelink SS sequence.

To be noted that, the number of beams of the interfering UE1 using a first set of beams to perform sidelink transmission as discussed above may be implied by sidelink SS or indicated in PSBCH of UE1. Similarly, the number of beams of the currently transmitting UE2 using a second set of beams to perform sidelink transmission which will be described later with reference to FIG. 5 may be implied by sidelink SS or indicated in PSBCH of UE2.

When the currently transmitting UE2 senses only initial transmission using one beam of the first set of beams of the interfering UE1 during the sensing window, the UE2 is capable of deriving positions in time domain of initial transmissions using all other beams of the first set of beams, according to consecutive positions in time domain for initial transmissions using the first set of beams, as well as indication of beam index of each beam and indication of the number of beams in the first set of beams. Similarly, when the currently transmitting UE2 senses only retransmission using one beam of the first set of beams of the interfering UE1 during the sensing window, the UE2 is capable of deriving positions in time domain of retransmissions using all other beams of the first set of beams, according to consecutive positions in time domain for retransmissions using the first set of beams, as well as indication of beam index of each beam and indication of the number of beams in the first set of beams.

Figure 5:
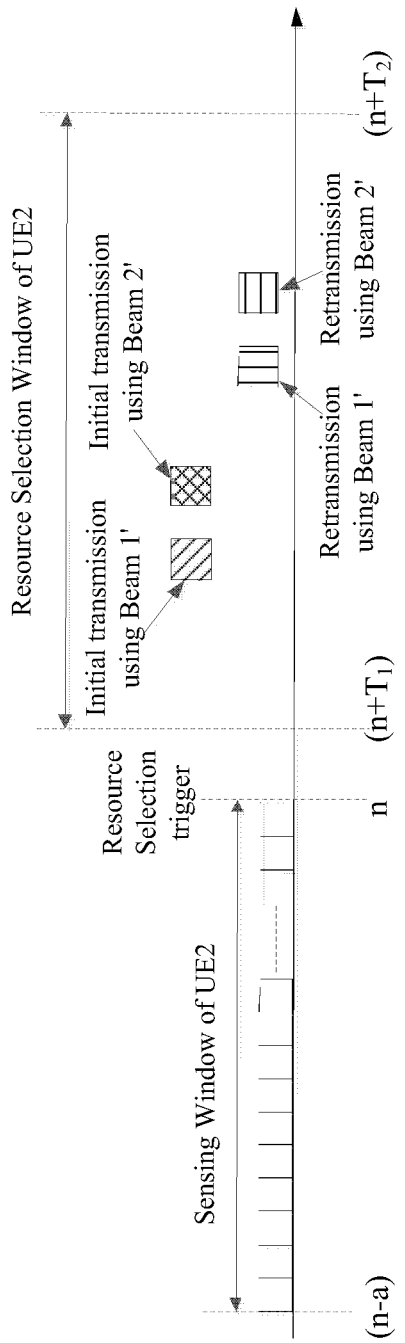
FIG. 5 schematically shows an exemplary scenario of resource selection when beam sweeping is applied in NR sidelink according to an embodiment of the present disclosure.

FIG. 5 schematically shows an exemplary scenario of resource selection when beam sweeping is applied in NR sidelink according to an embodiment of the present disclosure. The currently transmitting UE (i.e., UE2) performs sidelink transmission with selected resources in a resource selection window using each beam in the second set of beams. To be noted that, the number of beams in the second set of beams of the currently transmitting UE (i.e., UE2) is independent of the number of beams in the first set of beams of the interfering UE (i.e., UE1) as mentioned above, both of which may be configured by higher layers.

For example, as shown in FIG. 5, the second set of beams includes two beams, i.e., Beam 1' and Beam 2'. To be noted that, the number of beams in the second set of beams of the UE2 is not limited to two, and there may be any suitable number of beams in the second set of beams of the UE2 according to the embodiments of the present disclosure.

For a current traffic of the UE2, in order to sense and select resource for transmitting the current traffic, a sensing window for the UE2 is configured, preconfigured or specified, for example, as a time interval from a timing (n−a) to a timing n, i.e., the time interval [n−a, n], and a resource selection window for the UE2 is configured, preconfigured or specified, for example, as a time interval [n+$T_1$, n+$T_2$], wherein the timing n is a timing of resource selection trigger for the current traffic indicated by a higher layer signaling.

In an embodiment, the circuitry 220 of the UE2 is operative to set a time interval for the resource selection window to include, within the resource selection window, candidate resources for initial transmission using each of the second set of beams and candidate resources for retransmission using each of the second set of beams. For example, the circuitry 220 of the UE2 is operative to set $T_2$ of the resource selection window to include, within the resource selection window, candidate resource for initial transmission using Beam 1', candidate resource for initial transmission using Beam 2', candidate resource for retransmission using Beam 1' and candidate resource for retransmission using Beam 2'.

Furthermore, in an embodiment, initial transmissions or retransmissions using the second set of beams are bundled together for resource selection in the resource selection window. For example, the initial transmission using Beam 1' and the initial transmission using Beam 2' are bundled together for resource selection. Similarly, the retransmission using Beam 1' and the retransmission using Beam 2' are bundled together for resource selection.

For example, the initial transmission using Beam 1' and the initial transmission using Beam 2' of the second set of beams are performed if a set of consecutive candidate resources for the initial transmissions in time domain are selected, and the retransmission using Beam 1' and the retransmission using Beam 2' of the second set of beams are performed if a set of consecutive candidate resources for the retransmissions in time domain are selected. In addition, the number of candidate resources in the set of consecutive candidate resources for the initial transmissions and the number of candidate resources in the set of consecutive candidate resources for the retransmissions are the same as the number of beams in the second set of beams respectively. For example, in the embodiment shown in FIG. 5, the number of candidate resources in the set of consecutive candidate resources for the initial transmissions and the number of candidate resources in the set of consecutive candidate resources for the retransmissions are both two.

In addition, in another embodiment, the circuitry 220 of the UE2 is operative to set $T_2$ of the resource selection window to guarantee all of the initial transmission using Beam 1', the initial transmission using Beam 2', the retransmission using Beam 1' and the retransmission using Beam 2' satisfy a latency requirement during resource selection procedure. Advantageously, this guarantees the latency requirement for transmission behavior of the UE2 in a case of beam sweeping used in NR sidelink.

It should be noted that both the initial transmissions and the retransmissions performed by the UE2 as shown in example of FIG. 5 are only illustrative, but not limited thereto. In another embodiment, the UE2 may perform only the initial transmissions using each of the second set of beams respectively.

It should also be noted that the initial transmissions using each of the second set of beams respectively and the retransmissions using each of the second set of beams respectively as shown in example of FIG. 5 are only illustrative, but not limited thereto. In other words, beams used for initial transmissions of the TB may be different from beams used for the retransmissions of the same TB. In an embodiment, the second set of beams of the UE2 may be divided into two subsets of which one is used for initial transmissions and the other one is used for retransmissions. For example, it is assumed that the UE2 has a second set of beams including five beams, of which three are considered as a first subset of beams used for initial transmissions, and the other two are considered as a second subset of beams used for retransmissions. Optionally, each beam in the second subset of beams used for retransmissions may be a little wider than that in the first subset of beams used for initial transmissions.

In a case where the system load is too large, if a large number of different beams are used to perform sidelink transmission, the transmission performance will be affected. Taking the above in consideration, there is provided a congestion control strategy according to an embodiment of the present disclosure.

In this embodiment, in a case that the UE2 performs sidelink transmission using the second set of beams as shown in FIG. 5, the number of beams in the second set of beams is not larger than a maximum allowable number of beams. For example, the maximum allowable number of beams is determined based on transmission parameter of the UE2.

In order to support the congestion control strategy in the scenario of beam sweeping, according to an embodiment of the present disclosure, the maximum allowable number of beams is added in the transmission parameter based on LTE Rel. 14. The modified RRC signaling on transmission parameter is shown below.

```
SL-PSSCH-TxParameters-r14 ::=  SEQUENCE {
    minMCS-PSSCH-r14              INTEGER (0..31),
    maxMCS-PSSCH-r14              INTEGER (0..31),
    minSubChannel-NumberPSSCH-r14 INTEGER (1..20),
    maxSubchannel-NumberPSSCH-r14 INTEGER (1..20),
    allowedRetxNumberPSSCH-r14 ENUMERATED {n0, n1, both,
spare1},
    allowedBeamNumberPSSCH ENUMERATED (1, 2, ..., FFS)
    maxTxPower-r14                SL-TxPower-r14 OPTIONAL
      -- Cond CBR
}
```

In addition, a corresponding transmission parameter is configured or preconfigured for a certain value of Channel Busy Ratio (CBR) and a certain value of PPPP of the UE2, wherein CBR indicates congestion level of the UE2, and PPPP indicates priority of a currently traffic of the UE2. For example, for a certain CBR value of the UE2, the UE2 is configured or preconfigured with a mapping table indicating a corresponding transmission parameter for each of a plurality of PPPP values. That is, the corresponding transmission parameter is configured or preconfigured for a certain CBR value and a certain PPPP value of the UE2.

Accordingly, the maximum allowable number of beams included in the corresponding transmission parameter is specific to a UE, and varies depending on the CBR value and the PPPP value. For example, in a case that CBR value is 70%, the maximum allowable number of beams is only 2 for traffic with a certain PPPP value.

Advantageously, by configuring or preconfiguring a maximum allowable number of beams in transmission parameter of a UE for a certain CBR value and certain PPPP value, the congestion control strategy is supported in the scenario of beamsweeping. That is, for certain priority and CBR value, large number of beams are not allowed to avoid congestion.

Figure 6:
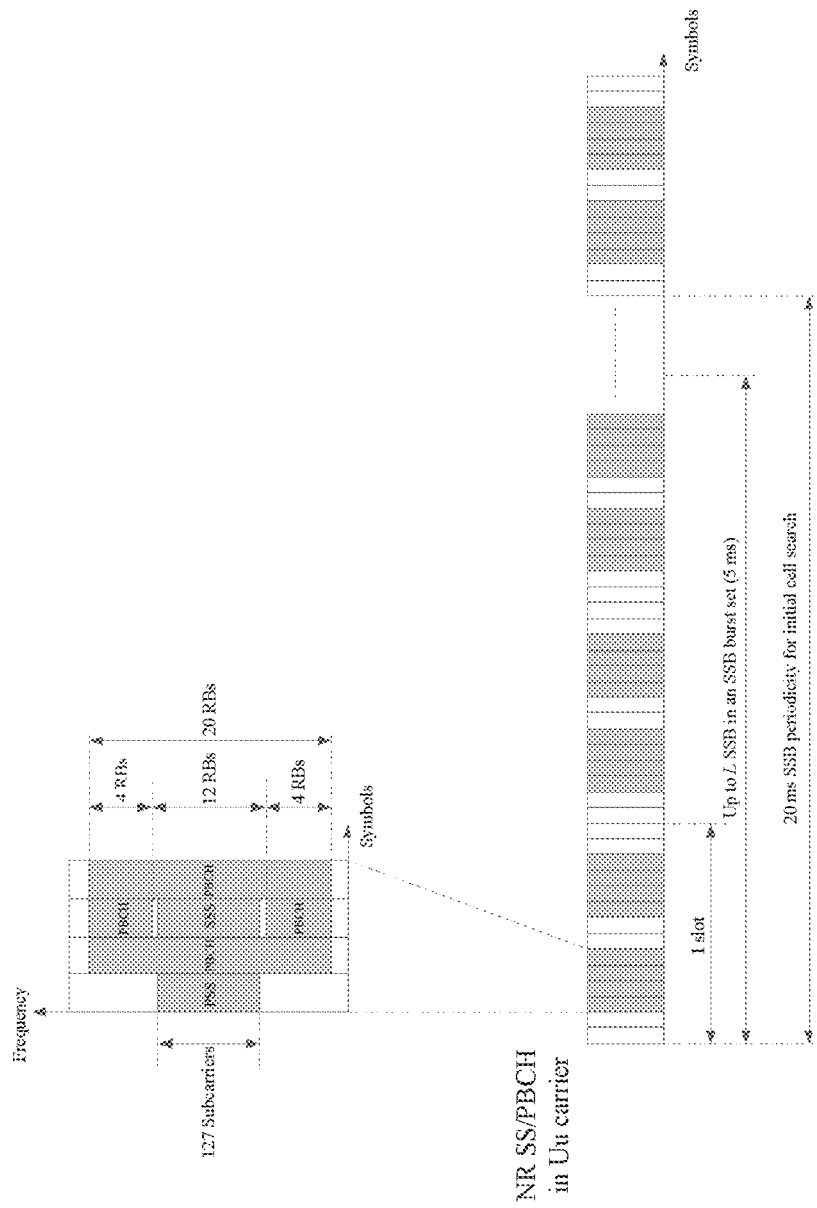
FIG. 6 schematically shows NR Synchronization Signal (SS)/Physical Broadcast Channel (PBCH) allocation in Uu carrier according to one embodiment of the present disclosure.

FIG. 6 schematically shows NR SS/PBCH allocation in Uu carrier according to one embodiment of the present disclosure. One slot as shown in FIG. 6 has 14 symbols. In this embodiment, in NR which is operated in Uu carrier, one slot has two SS/PBCH Block each of which corresponds to one beam when analogue beamforming or hybrid beamforming is applied. Further, some symbols between two adjacent SS/PBCH Blocks are reserved for allocating Physical Downlink Control Channel (PDCCH)/Physical Uplink Control Channel (PUCCH)/Sounding Reference Signal (SRS). In an example, each block includes Primary Synchronization Signal (PSS) and Secondary Synchronization Signal (SSS) as well as PBCH. For example, an exemplary format of the SS/PBCH is shown in FIG. 6.

To be noted that, the exemplary format of the SS/PBCH is only shown for illustrative purposes, and those skilled in the art will understand that other formats of the SS/PBCH (for example, occupying less or more symbols, or allocating PSS, SSS and PBCH in different positions) may be considered depending on practical applications and scenarios according to the embodiments of the present disclosure.

Figure 7:
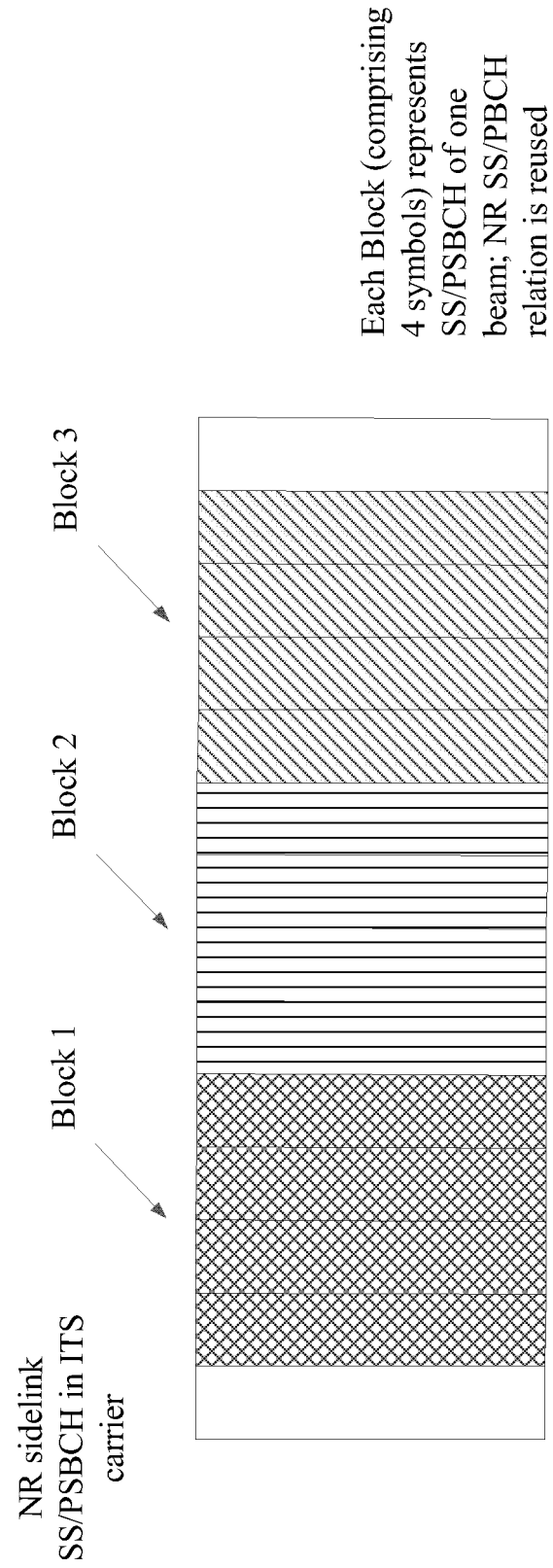
FIG. 7 schematically shows NR sidelink SS/Physical Sidelink Broadcast Channel (PSBCH) allocation in ITS (intelligent transportation system) carrier according to another embodiment of the present disclosure.

FIG. 7 schematically shows NR sidelink SS/PSBCH allocation in ITS carrier according to another embodiment of the present disclosure. For example, in ITS carrier where only NR sidelink is operated, there is no need to reserve symbols for PDCCH, PUCCH or SRS. In this case, more symbols in one slot could be used for transmitting sidelink SS/PSBCH for NR sidelink. Thus, more compact pattern is designed for sidelink SS/PSBCH of NR sidelink compared to the example shown in FIG. 6. In an embodiment, as shown in FIG. 7, one slot has three sidelink SS/PSBCH Block each of which corresponds to one beam when analogue beamforming or hybrid beamforming is applied. In an example, each block includes sidelink PSS and sidelink SSS as well as PSBCH. In another example, each block includes only sidelink PSS and sidelink SSS without PSBCH.

To be noted that, if NR sidelink SS/PSBCH occupies less than four symbols as shown in the example of FIG. 7, the number of supported sidelink SS/PSBCH will be increased to more than three in one slot.

Given the above, three or more sets of sidelink SS/PSBCH may be allocated in one slot. Advantageously, more compact pattern for sidelink SS/PSBCH in NR sidelink may achieve better resource utilization and less latency.

Figure 8:
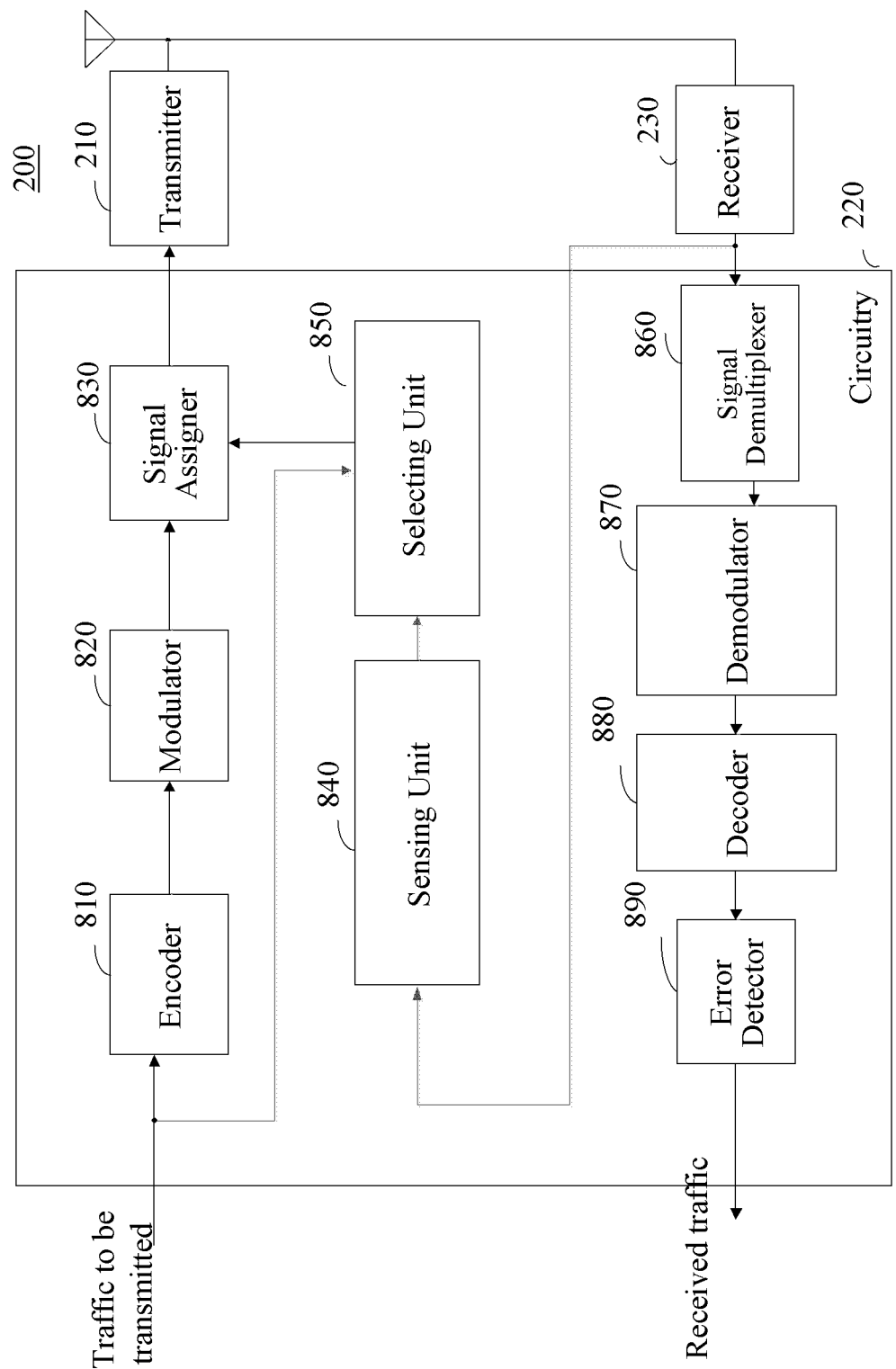
FIG. 8 schematically shows a detailed block diagram of a user equipment according to an embodiment of the present disclosure.

FIG. 8 schematically shows a detailed block diagram of a user equipment according to an embodiment of the present disclosure.

As shown in FIG. 8, the UE 200 includes the transmitter 210, the circuitry 220 and the receiver 230. Optionally, the circuitry 220 may include a sensing unit 840 and a selecting unit 850. Optionally, the circuitry 220 may further include an encoder 810, a modulator 820, a signal assigner 830, a signal demultiplexer 860, a demodulator 870, a decoder 880, and an error detector 890.

The same reference numbers are used in FIG. 8 for indicating the same elements as shown in FIG. 2. To avoid having the description become complex, in this case, the constituent elements related to the transmission of traffic, which are closely connected with the features of the present embodiment, are mainly shown.

The encoder 810 encodes the traffic to be transmitted to obtain the encoded signal, the modulator 820 modulates the encoded signal to obtain the modulated signal, the signal assigner 830 assigns resources for the modulated signal according to a resource selection result from the circuitry, e.g., from the selecting unit 850. And the transmitter 210 transmits the signal indicative of the traffic.

In one embodiment, the sensing unit 840 senses transmissions of a TB performed by another UE using each of a first set of beams respectively, and the selecting unit 850 select resource for sidelink transmission among candidate resources based on a measurement result. Furthermore, the sensing unit 840 performs measurement on the received transmissions, and precludes, from the candidate resources, one or more candidate resources associated with initial transmission and retransmission using a beam of the first set of beams, if the measurement result of the transmission using the beam fulfills a predetermined condition (the detailed operations with references to FIG. 3, the details thereof are omitted for the purpose of clarity and brevity). The selected resources output to the signal assigner 830 are used for transmitting traffic.

The receiver 230 receives traffic from the antenna, for example, receives transmissions of a TB performed by another UE using each of a first set of beams respectively. The signal demultiplexer 860 demultiplexes the received traffic by Fast Fourier Transform (FFT) and sends the demultiplexed traffic to the demodulator 870. The demodulator 870 demodulates the demultiplexed traffic to generate demodulated traffic. The decoder 880 decodes the demodulated traffic, and the error detector 890 performs checking procedure (e.g., Cyclic Redundancy Check, CRC) to check the received traffic.

To be noted that although FIG. 8 shows the parts, i.e., the encoder 810, the modulator 820, the signal assigner 830, the signal demultiplexer 860, the demodulator 870, the decoder 880, and the error detector 890 are within the circuitry 220, this is only an example, but not a limitation, in fact, for example, one or more of the integrated parts may be separated from the circuitry 220 depending on requirements of the communication apparatus.

To be noted that although FIG. 8 shows the sensing unit 840 and the selecting unit 850 in separate units, this is only an example, but not a limitation. For example, they may be implemented within a unit or integrated with each other as an integrated circuit, or they may be in other forms.

Figure 9:
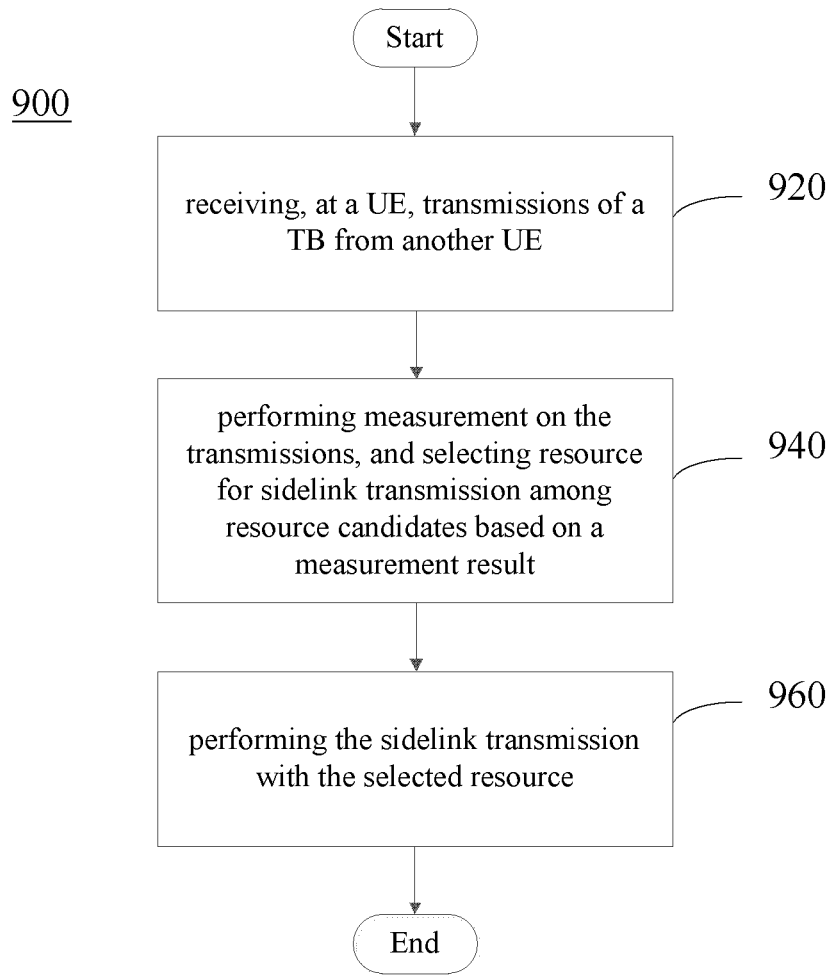
FIG. 9 schematically shows a flowchart of a communication method according to an embodiment of the present disclosure.

FIG. 9 schematically shows a flowchart 900 of a communication method according to an embodiment of the present disclosure. For example, the communication method may be performed by the UE 200 as shown in FIG. 2. Although specific steps are disclosed in FIG. 9, such steps are exemplary. That is, the present disclosure is well suited to performing various other steps or variations of the steps recited in FIG. 9. FIG. 9 is described with references to FIGS. 1-8.

At a step 920, the UE 200 receives transmissions of a TB performed by another UE using each of a first set of beams respectively.

At a step 940, the UE 200 performs measurement on the received transmissions, and selects resource for sidelink transmission among candidate resources based on a measurement result.

In an embodiment, at the step 940, the UE 200 further precludes, from the candidate resources, one or more candidate resources associated with a transmission using a beam of the first set of beams, if the measurement result of the transmission using the beam fulfills a predetermined condition.

In an embodiment, receiving transmissions of a TB performed by another UE using each of a first set of beams respectively comprises: receiving at least one of initial transmissions of the TB and retransmissions of the same TB using each of the first set of beams respectively. Further, precluding one or more candidate resources associated with transmission using a beam of the first set of beams comprises: precluding one or more candidate resources associated with at least one of initial transmission and retransmission using the beam of the first set of beams.

In an embodiment, the beam is determined by measuring RSRP of sidelink SS or PSBCH for the received at least one of initial transmissions and retransmissions.

In an embodiment, the initial transmissions or retransmissions of the same TB using the first set of beams are performed on a same position in frequency domain and consecutive positions in time domain.

In an embodiment, the number of beams in the first set of beams is implied by sidelink SS of the other UE or indicated in PSBCH of the other UE.

In an embodiment, the sidelink transmission is performed by using a second set of beams, and the number of beams in the second set of beams is not larger than a maximum allowable number of beams determined based on transmission parameter of the UE 200, a corresponding transmission parameter being configured or preconfigured for a certain value of CBR and a certain value of PPPP of the UE 200.

In an embodiment, the measurement result is obtained by performing RSRP measurement, and the predetermined condition is the measured RSRP exceeds a certain threshold.

At a step 960, the UE 200 performs the sidelink transmission with the selected resource.

Moreover, in an embodiment, in a case that the UE 200 performs sidelink transmission using a second set of beams, the UE 200 sets a time interval for a resource selection window to include, within the resource selection window, candidate resources for initial transmission using each of the second set of beams and candidate resources for retransmission using each of the second set of beams. Further, the time interval for the resource selection window fulfills latency requirement for initial transmission using each of a second set of beams and retransmission using each of the second set of beams.

Further, in this embodiment, initial transmissions or retransmissions using the second set of beams are bundled together for resource selection in the resource selection window. For example, the initial transmissions using the second set of beams are performed if a set of consecutive candidate resources for the initial transmissions in time domain are selected, and the retransmissions using the second set of beams are performed if a set of consecutive candidate resources for the retransmissions in time domain are selected, the number of candidate resources in the set of consecutive candidate resources for the initial transmissions and the number of candidate resources in the set of consecutive candidate resources for the retransmissions being the same as the number of beams in the second set of beams respectively.

In addition, in NR sidelink, three or more sets of sidelink SS/PSBCH are allocated in one slot. That is, more compact pattern is designed for sidelink SS/PSBCH of NR sidelink.

Figure 10:
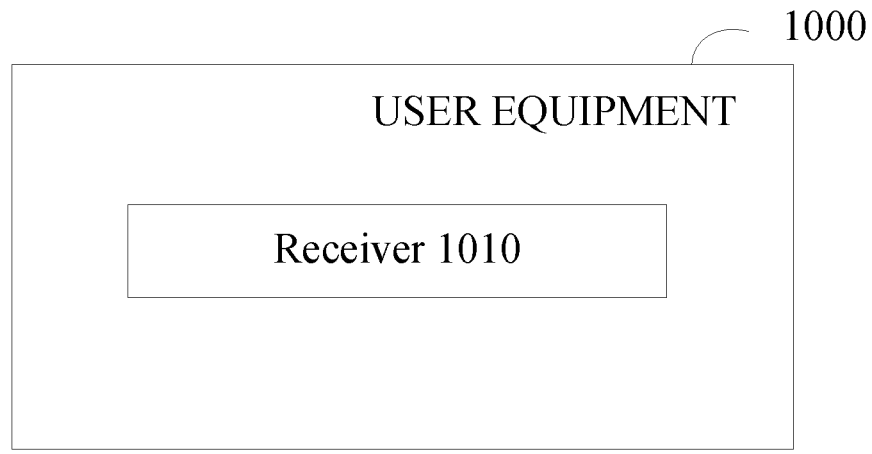
FIG. 10 illustrates a block diagram of a user equipment according to an embodiment of the present disclosure.

FIG. 10 illustrates a block diagram of a user equipment 1000 according to an embodiment of the present disclosure. The UE 1000 includes a receiver 1010 that receives traffic from a second UE. Further, there is a third UE considered as an interfering UE which may causes large interference to sidelink transmission from the second UE and the UE 1000.

In an embodiment, the receiver 1010 of the UE 1000 performs sidelink reception from the second UE. For example, the sidelink reception is performed with resource which is selected by the second UE among candidate resources based on a measurement result, the measurement result being obtained by the second UE performing measurement on transmissions of a TB received from a third UE and performed by the third UE using each of a first set of beams respectively.

In an embodiment, one or more candidate resources associated with a transmission by the third UE using a beam of the first set of beams are precluded from the candidate resources, if the measurement result of the transmission by the third UE using the beam fulfills a predetermined condition.

The precluding operation of the second UE has been described with reference to FIG. 3, the allocated resource positions in a case that beam sweeping is used for sidelink transmission has been described with reference to FIG. 4, the configuration of the resource selection window has been described with reference to FIG. 5 and the pattern for SS/PSBCH in NR sidelink has been described with references to FIGS. 6 and 7, all the mentioned above may be applied thereto, thus, the detailed description will be omitted herein for the purposes of clarity and brevity.

Figure 11:
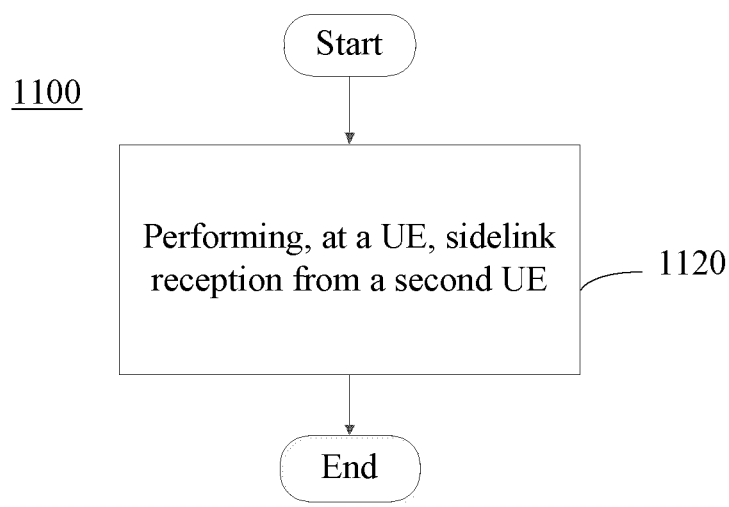
FIG. 11 schematically shows a flowchart of a communication method according to an embodiment of the present disclosure.

FIG. 11 schematically shows a flowchart of a communication method according to an embodiment of the present disclosure. In an embodiment, the communication method may be performed by the UE 1000 to receive traffic, e.g., from the UE 200. Although specific step is disclosed in FIG. 11, such step is exemplary. That is, the present disclosure is well suited to performing various other steps or variations of the steps recited in FIG. 11.

At a step 1120, the UE 1000 performs sidelink reception from a second UE. Further, there is a third UE considered as an interfering UE which may causes large interference to sidelink transmission from the second UE and the UE 1000.

In an embodiment, the receiver 1010 of the UE 1000 performs sidelink reception from the second UE. For example, the sidelink reception is performed with resource which is selected by the second UE among candidate resources based on a measurement result, the measurement result being obtained by the second UE performing measurement on transmissions of a TB received from a third UE and performed by the third UE using each of a first set of beams respectively.

In an embodiment, one or more candidate resources associated with al transmission by the third UE using a beam of the first set of beams are precluded from the candidate resources, if the measurement result of the transmission by the third UE using the beam fulfills a predetermined condition.

The precluding operation of the second UE has been described with reference to FIG. 3, the allocated resource positions in a case that beam sweeping is used for sidelink transmission has been described with reference to FIG. 4, the configuration of the resource selection window has been described with reference to FIG. 5 and the pattern for SS/PSBCH in NR sidelink has been described with references to FIGS. 6 and 7, all the mentioned above may be applied thereto, thus, the detailed description will be omitted herein for the purposes of clarity and brevity.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

Embodiments of the present disclosure can at least provide the following subject matters.

(1). A user equipment, comprising:
  a receiver, operative to receive transmissions of a TB performed by another UE using each of a first set of beams respectively;
  circuitry, operative to perform measurement on the received transmissions, and to select resource for sidelink transmission among candidate resources based on a measurement result; and
  a transmitter, operative to perform the sidelink transmission with the selected resource,
  wherein, the circuitry is further operative to preclude, from the candidate resources, one or more candidate resources associated with a transmission using a beam of the first set of beams, if the measurement result of the transmission using the beam fulfills a predetermined condition.

(2). The user equipment according to (1), wherein, receiving transmissions of a TB performed by another UE using each of a first set of beams respectively comprises: receiving at least one of initial transmissions of the TB and retransmissions of the same TB using each of the first set of beams respectively; and
  precluding one or more candidate resources associated with a transmission using a beam of the first set of beams comprises: precluding one or more candidate resources associated with at least one of initial transmission and retransmission using the beam of the first set of beams.

(3). The user equipment according to (1), wherein the beam is determined by measuring RSRP of sidelink SS or PSBCH for the received transmissions.

(4). The user equipment according to (1), wherein the circuitry is further operative to set a time interval for a resource selection window to include, within the resource selection window, candidate resources for initial transmission using each of a second set of beams and candidate resources for retransmission using each of the second set of beams.

(5). The user equipment according to (4), wherein the time interval for the resource selection window fulfills latency requirement.

(6). The user equipment according to (4), wherein initial transmissions or retransmissions using the second set of beams are bundled together for resource selection in the resource selection window.

(7). The user equipment according to (6), wherein the initial transmissions using the second set of beams are performed if a set of consecutive candidate resources for the initial transmissions in time domain are selected, and the retransmissions using the second set of beams are performed if a set of consecutive candidate resources for the retransmissions in time domain are selected, the number of candidate resources in the set of consecutive candidate resources for the initial transmissions and the number of candidate resources in the set of consecutive candidate resources for the retransmissions being the same as the number of beams in the second set of beams respectively.

(8). The user equipment according to (2), wherein the initial transmissions or retransmissions of the same TB using the first set of beams are performed on a same position in frequency domain and consecutive positions in time domain.

(9). The user equipment according to (1), wherein the number of beams in the first set of beams is implied by sidelink SS of the other UE or indicated in PSBCH of the other U E.

(10). The user equipment according to (1), wherein the sidelink transmission is performed by using a second set of beams, and the number of beams in the second set of beams is not larger than a maximum allowable number of beams determined based on transmission parameter of the UE, a corresponding transmission parameter being configured or preconfigured for a certain value of CBR and a certain value of PPPP of the UE.

(11). The user equipment according to (1), wherein three or more sets of sidelink SS and PSBCH are allocated in one slot.

(12). The user equipment according to (1), wherein the circuitry is operative to perform RSRP measurement to obtain the measurement result, and the predetermined condition is the measured RSRP exceeds a certain threshold.

(13). A communication method, comprising:
receiving, at a UE, transmissions of a TB performed by another UE using each of a first set of beams respectively;
performing measurement on the received transmissions, and selecting resource for sidelink transmission among candidate resources based on a measurement result; and
performing the sidelink transmission with the selected resource,
wherein, the method further comprises precluding, from the candidate resources, one or more candidate resources associated with a transmission using a beam of the first set of beams, if the measurement result of the transmission using the beam fulfills a predetermined condition.

(14). The communication method according to (13), wherein, receiving transmissions of a TB performed by another UE using each of a first set of beams respectively comprises: receiving at least one of initial transmissions of the TB and retransmissions of the same TB using each of the first set of beams respectively; and
precluding one or more candidate resources associated with a transmission using a beam of the first set of beams comprises: precluding one or more candidate resources associated with at least one of initial transmission and retransmission using the beam of the first set of beams.

(15). The communication method according to (13), wherein the beam is determined by measuring RSRP of sidelink SS or PSBCH for the received transmissions.

(16). The communication method according to (13), the method further comprising: setting a time interval for a resource selection window to include, within the resource selection window, candidate resources for initial transmission using each of a second set of beams and candidate resources for retransmission using each of the second set of beams.

(17). The communication method according to (16), wherein the time interval for the resource selection window fulfills latency requirement.

(18). The communication method according to (16), wherein initial transmissions or retransmissions using the second set of beams are bundled together for resource selection in the resource selection window.

(19). The communication method according to (18), wherein the initial transmissions using the second set of beams are performed if a set of consecutive candidate resources for the initial transmissions in time domain are selected, and the retransmissions using the second set of beams are performed if a set of consecutive candidate resources for the retransmissions in time domain are selected, the number of candidate resources in the set of consecutive candidate resources for the initial transmissions and the number of candidate resources in the set of consecutive candidate resources for the retransmissions being the same as the number of beams in the second set of beams respectively.

(20). The communication method according to (14), wherein the initial transmissions or retransmissions of the same TB using the first set of beams are performed on a same position in frequency domain and consecutive positions in time domain.

(21). The communication method according to (13), wherein the number of beams in the first set of beams is implied by sidelink SS of the other UE or indicated in PSBCH of the other UE.

(22). The communication method according to (13), wherein the sidelink transmission is performed by using a second set of beams, and the number of beams in the second set of beams is not larger than a maximum allowable number of beams determined based on transmission parameter of the UE, a corresponding transmission parameter being configured or preconfigured for a certain value of CBR and a certain value of PPPP of the UE.

(23). The communication method according to (13), wherein three or more sets of sidelink SS and PSBCH are allocated in one slot.

(24). The communication method according to (13), wherein the measurement result is obtained by performing RSRP measurement, and the predetermined condition is the measured RSRP exceeds a certain threshold.

(25). A user equipment (UE), comprising:
a receiver, operative to perform sidelink reception from a second UE,
wherein, the sidelink reception is performed with resource which is selected by the second UE among candidate resources based on a measurement result, the measurement result being obtained by the second UE performing measurement on transmissions of a TB received from a third UE and performed by the third UE using each of a first set of beams respectively, and
wherein, one or more candidate resources associated with a transmission by the third UE using a beam of the first set of beams are precluded from the candidate resources, if the measurement result of the transmission by the third UE using the beam fulfills a predetermined condition.

(26). The user equipment according to (25), wherein, transmissions of a TB received from a third UE and performed by the third UE using each of a first set of beams respectively comprises: at least one of initial transmissions of the TB and retransmissions of the same TB using each of the first set of beams respectively; and
one or more candidate resources associated with a transmission using a beam of the first set of beams comprises: one or more candidate resources associated with at least one of initial transmission and retransmission using the beam of the first set of beams.

(27). The user equipment according to (25), wherein the beam is determined by the second UE measuring RSRP of sidelink SS or PSBCH for the received transmissions.

(28). The user equipment according to (25), wherein a time interval for a resource selection window of the second UE is set to include, within the resource selection window, candidate resources for initial transmission using each of a second set of beams and candidate resources for retransmission using each of the second set of beams.

(29). The user equipment according to (28), wherein the time interval for the resource selection window of the second UE fulfills latency requirement.

(30). The user equipment according to (28), wherein initial transmissions or retransmissions performed by the second UE using the second set of beams are bundled together for resource selection in the resource selection window.

(31). The user equipment according to (30), wherein the initial transmissions using the second set of beams are performed if a set of consecutive candidate resources for the initial transmissions in time domain are selected, and the retransmissions using the second set of beams are performed if a set of consecutive candidate resources for the retransmissions in time domain are selected, the number of candidate resources in the set of consecutive candidate resources for the initial transmissions and the number of candidate resources in the set of consecutive candidate resources for the retransmissions being the same as the number of beams in the second set of beams respectively.

(32). The user equipment according to (26), wherein the initial transmissions or retransmissions of the same TB using the first set of beams are performed on a same position in frequency domain and consecutive positions in time domain.

(33). The user equipment according to (25), wherein the number of beams in the first set of beams is implied by sidelink SS of the third UE or indicated in PSBCH of the third UE.

(34). The user equipment according to (25), wherein the sidelink transmission is performed by the second UE using a second set of beams, and the number of beams in the second set of beams is not larger than a maximum allowable number of beams determined based on transmission parameter of the second UE, a corresponding transmission parameter being configured or preconfigured for a certain value of CBR and a certain value of PPPP of the second UE.

(35). The user equipment according to (25), wherein three or more sets of sidelink SS and PSBCH are allocated in one slot.

(36). The user equipment according to (25), wherein the measurement result is obtained by the second UE performing RSRP measurement, and the predetermined condition is the measured RSRP exceeds a certain threshold.

(37). A communication method, comprising:
performing, at a UE, sidelink reception from a second UE,
wherein, the sidelink reception is performed with resource which is selected by the second UE among candidate resources based on a measurement result, the measurement result being obtained by the second UE performing measurement on transmissions of a TB received from a third UE and performed by the third UE using each of a first set of beams respectively, and
wherein, one or more candidate resources associated with a transmission by the third UE using a beam of the first set of beams are precluded from the candidate resources, if the measurement result of the transmission by the third UE using the beam fulfills a predetermined condition.

(38). The communication method according to (37), wherein, transmissions of a TB received from a third UE and performed by the third UE using each of a first set of beams respectively comprises: at least one of initial transmissions of the TB and retransmissions of the same TB using each of the first set of beams respectively; and
one or more candidate resources associated with a transmission using a beam of the first set of beams comprises: one or more candidate resources associated with at least one of initial transmission and retransmission using the beam of the first set of beams.

(39). The communication method according to (37), wherein the beam is determined by the second UE measuring RSRP of sidelink SS or PSBCH for the received transmissions.

(40). The communication method according to (37), wherein a time interval for a resource selection window of the second UE is set to include, within the resource selection window, candidate resources for initial transmission using each of a second set of beams and candidate resources for retransmission using each of the second set of beams.

(41). The communication method according to (40), wherein the time interval for the resource selection window of the second UE fulfills latency requirement.

(42). The communication method according to (40), wherein initial transmissions or retransmissions performed by the second UE using the second set of beams are bundled together for resource selection in the resource selection window.

(43). The communication method according to (42), wherein the initial transmissions using the second set of beams are performed if a set of consecutive candidate resources for the initial transmissions in time domain are selected, and the retransmissions using the second set of beams are performed if a set of consecutive candidate resources for the retransmissions in time domain are selected, the number of candidate resources in the set of consecutive candidate resources for the initial transmissions and the number of candidate resources in the set of consecutive candidate resources for the retransmissions being the same as the number of beams in the second set of beams respectively.

(44). The communication method according to (38), wherein the initial transmissions or retransmissions of the same TB using the first set of beams are performed on a same position in frequency domain and consecutive positions in time domain.

(45). The communication method according to (37), wherein the number of beams in the first set of beams is implied by sidelink SS of the third UE or indicated in PSBCH of the third UE.

(46). The communication method according to (37), wherein the sidelink transmission is performed by the second UE using a second set of beams, and the number of beams in the second set of beams is not larger than a maximum allowable number of beams determined based on transmission parameter of the second UE, a corresponding transmission parameter being configured or preconfigured for a certain value of CBR and a certain value of PPPP of the second UE.

(47). The communication method according to (37), wherein three or more sets of sidelink SS and PSBCH are allocated in one slot.

(48). The communication method according to (37), wherein the measurement result is obtained by the second UE performing RSRP measurement, and the predetermined condition is the measured RSRP exceeds a certain threshold.

(49). A user equipment, comprising:
a receiver, operative to receive transmissions of a TB performed by another UE using each of a first set of beams respectively;
circuitry, operative to perform measurement on the received transmissions, and to select resource for sidelink transmission among candidate resources based on a measurement result; and
a transmitter, operative to perform the sidelink transmission with the selected resource,
wherein, the circuitry is further operative to preclude, from the candidate resources, one or more candidate resources associated with the transmissions using each of the first set of beams, if the measurement result of a transmission using at least one beam of the first set of beams fulfills a predetermined condition.

(50). A communication method, comprising:
receiving, at a UE, transmissions of a TB performed by another UE using each of a first set of beams respectively;
performing measurement on the received transmissions, and selecting resource for sidelink transmission among candidate resources based on a measurement result; and
performing the sidelink transmission with the selected resource,
wherein, the method further comprises precluding, from the candidate resources, one or more candidate resources associated with the transmissions using each of the first set of beams, if the measurement result of a transmission using at least one beam of the first set of beams fulfills a predetermined condition.

(51). A user equipment, comprising:
circuitry, operative to set a time interval for a resource selection window to include, within the resource selection window, candidate resources for initial transmission using each of a set of beams and candidate resources for retransmission using each of the set of beams; and
a transmitter, operative to perform sidelink transmission using the set of beams.

(52). A communication method, comprising:
setting a time interval for a resource selection window to include, within the resource selection window, candidate resources for initial transmission using each of a set of beams and candidate resources for retransmission using each of the set of beams; and
performing sidelink transmission using the set of beams.

(53). A user equipment, comprising:
circuitry, operative to allocate three or more sets of sidelink SS and PSBCH in one slot; and
a transmitter, operative to transmit the sidelink SS and PSBCH using a plurality of beams.

(54). A communication method, comprising:
allocating three or more sets of sidelink SS and PSBCH in one slot; and
transmitting the sidelink SS and PSBCH using a plurality of beams.

The invention claimed is:

1. A second user equipment (UE2), comprising:
a receiver, operative to receive transmissions of a Transport Block (TB) performed by a first UE (UE1) using each of a first set of beams respectively;
circuitry, operative to perform measurement on the received transmissions, and to select resource for sidelink transmission among candidate resources based on a measurement result; and
a transmitter, operative to perform the sidelink transmission with the selected resource,
wherein, the circuitry is further operative to preclude, from only the candidate resources related to a beam of the first set of beams, one or more candidate resources associated with a transmission using the beam of the first set of beams, if the measurement result of the transmission using the beam of the first set of beams fulfills a predetermined condition,
the circuitry is further operative to set a time interval for a resource selection window to include, within the resource selection window, candidate resources for initial transmission using each of a second set of beams and candidate resources for retransmission using each of the second set of beams,
the initial transmissions or retransmissions using the second set of beams are bundled together for resource selection in the resource selection window, and
the initial transmissions using the second set of beams are performed if a set of consecutive candidate resources for the initial transmissions in time domain are selected, and the retransmissions using the second set of beams are performed if a set of consecutive candidate resources for the retransmissions in time domain are selected, the number of candidate resources in the set of consecutive candidate resources for the initial transmissions and the number of candidate resources in the set of consecutive candidate resources for the retransmissions being the same as the number of beams in the second set of beams respectively.

2. The second user equipment (UE2) of claim 1, wherein, receiving transmissions of the TB performed by the first UE (UE1) using each of the first set of beams respectively comprises: receiving at least one of initial transmissions of the TB and retransmissions of the same TB using each of the first set of beams respectively; and
precluding one or more candidate resources associated with the transmission using the beam of the first set of beams comprises: precluding one or more candidate resources associated with at least one of the initial transmission or the retransmission using the beam of the first set of beams.

3. The second user equipment (UE2) of claim 2, wherein the initial transmissions or retransmissions of the same TB using the first set of beams are performed on a same position in frequency domain and consecutive positions in time domain.

4. The second user equipment (UE2) of claim 1, wherein the beam is determined by measuring Reference Signal Received Power (RSRP) of sidelink Synchronization Signal (SS) or Physical Sidelink Broadcast Channel (PSBCH) for the received transmissions.

5. The second user equipment (UE2) of claim 1, wherein the time interval for the resource selection window is set to guarantee all initial transmissions and retransmissions satisfy a latency requirement.

6. The second user equipment (UE2) of claim 1, wherein the number of beams in the first set of beams is implied by sidelink Synchronization Signal (SS) of the first UE (UE1) or indicated in Physical Sidelink Broadcast Channel (PSBCH) of the first UE (UE1).

7. The second user equipment (UE2) of claim 1, wherein the sidelink transmission is performed by using a second set of beams, wherein the number of beams in the second set of beams is not larger than a maximum allowable number of beams determined based on a transmission parameter of the second UE (UE2), the transmission parameter being configured or preconfigured for a certain value of Channel Busy Ratio (CBR) and a certain value of ProSe Per-Packet Priority (PPPP) of the second UE (UE2).

8. The second user equipment (UE2) of claim 1, wherein three or more sets of sidelink Synchronization Signal (SS) and Physical Sidelink Broadcast Channel (PSBCH) are allocated in one slot.

9. The second user equipment (UE2) of claim 1, wherein the circuitry is operative to perform Reference Signal Received Power (RSRP) measurement to obtain the measurement result, and the predetermined condition is that the measured RSRP exceeds a certain threshold.

10. A communication method, comprising:
receiving, at a second UE (UE2), transmissions of a Transport Block (TB) performed by a first UE (UE1) using each of a first set of beams respectively;
performing measurement on the received transmissions, and selecting resource for sidelink transmission among candidate resources based on a measurement result; and
performing the sidelink transmission with the selected resource,
wherein, the method further comprises precluding, from only the candidate resources related to a beam of the first set of beams, one or more candidate resources associated with a transmission using the beam of the first set of beams, if the measurement result of the transmission using the beam of the first set of beams fulfills a predetermined condition,
the method is further set a time interval for a resource selection window to include, within the resource selection window, candidate resources for initial transmission using each of a second set of beams and candidate resources for retransmission using each of the second set of beams,
the initial transmissions or retransmissions using the second set of beams are bundled together for resource selection in the resource selection window, and
the initial transmissions using the second set of beams are performed if a set of consecutive candidate resources for the initial transmissions in time domain are selected, and the retransmissions using the second set of beams are performed if a set of consecutive candidate resources for the retransmissions in time domain are selected, the number of candidate resources in the set of consecutive candidate resources for the initial transmissions and the number of candidate resources in the set of consecutive candidate resources for the retransmissions being the same as the number of beams in the second set of beams respectively.

11. A first user equipment (UE1), comprising:
a receiver, operative to perform sidelink reception from a second UE (UE2),
wherein, the sidelink reception is performed with resource which is selected by the second UE (UE2) among candidate resources based on a measurement result, the measurement result being obtained by the second UE (UE2) performing measurement on transmissions of a Transport Block (TB) received from a third UE (UE3) using each of a first set of beams respectively, and
, one or more candidate resources associated with a transmission by the third UE (UE3) using a beam of the first set of beams are precluded from only the candidate resources related to the beam of the first set of beams, if the measurement result of the transmission by the third UE (UE3) using the beam of the first set of beams fulfills a predetermined condition,
the circuitry is further operative to set a time interval for a resource selection window to include, within the resource selection window, candidate resources for initial transmission using each of a second set of beams and candidate resources for retransmission using each of the second set of beams,
the initial transmissions or retransmissions using the second set of beams are bundled together for resource selection in the resource selection window, and
the initial transmissions using the second set of beams are performed if a set of consecutive candidate resources for the initial transmissions in time domain are selected, and the retransmissions using the second set of beams are performed if a set of consecutive candidate resources for the retransmissions in time domain are selected, the number of candidate resources in the set of consecutive candidate resources for the initial transmissions and the number of candidate resources in the set of consecutive candidate resources for the retransmissions being the same as the number of beams in the second set of beams respectively.

12. A communication method, comprising:
performing, at a first user equipment (UE1), sidelink reception from a second UE (UE2),
wherein, the sidelink reception is performed with resource which is selected by the second UE (UE2) among candidate resources based on a measurement result, the measurement result being obtained by the second UE (UE2) performing measurement on transmissions of a Transport Block (TB) received from a third UE (UE3) using each of a first set of beams respectively, and wherein, one or more candidate resources associated with a transmission by the third UE (UE3) using a beam of the first set of beams are precluded from only the candidate resources related to the beam of the first set of beams, if the measurement result of the transmission by the third UE (UE3) using the beam of the first set of beams fulfills a predetermined condition, the method is further set a time interval for a resource selection window to include, within the resource selection window, candidate resources for initial transmission using each of a second set of beams and candidate resources for retransmission using each of the second set of beams, the initial transmissions or retransmissions using the second set of beams are bundled together for resource selection in the resource selection window, and the initial transmissions using the second set of beams are performed if a set of consecutive candidate resources for the initial transmissions in time domain are selected, and the retransmissions using the second set of beams are performed if a set of consecutive candidate resources for the retransmissions in time domain are selected, the number of candidate resources in the set of consecutive candidate resources for the initial transmissions and the number of candidate resources in the set of consecutive candidate resources for the retransmissions being the same as the number of beams in the second set of beams respectively.

* * * * *